J. M. ROLL.
TIRE TREAD REMOVING DEVICE.
APPLICATION FILED JULY 2, 1920.
1,393,575.
Patented Oct. 11, 1921.
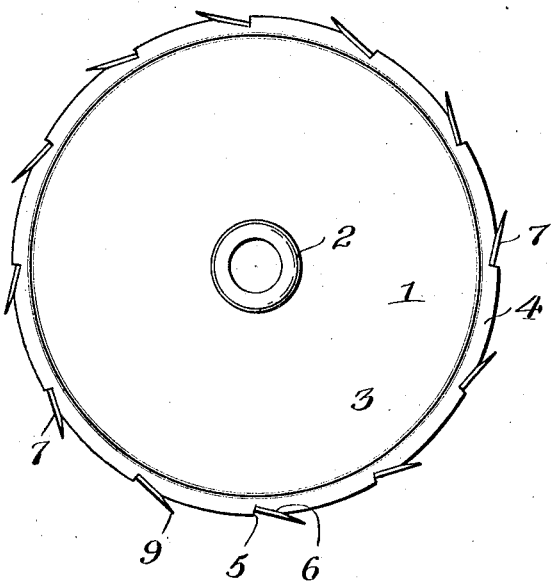
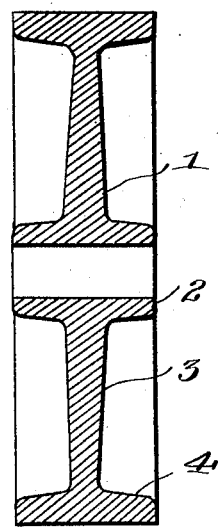
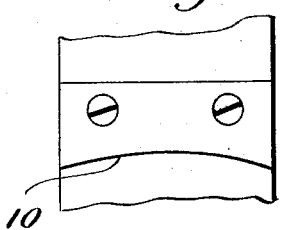
J. M. Roll
INVENTOR
BY Victor J. Evans
ATTORNEY

UNITED STATES PATENT OFFICE.

JOHN M. ROLL, OF CORRECTIONVILLE, IOWA, ASSIGNOR OF ONE-HALF TO CARL JACOBS AND ONE-FOURTH TO E. E. JACOBS, BOTH OF CORRECTIONVILLE, IOWA.

TIRE-TREAD-REMOVING DEVICE.

1,393,575.   Specification of Letters Patent.   Patented Oct. 11, 1921.

Application filed July 2, 1920. Serial No. 393,717.

*To all whom it may concern:*

Be it known that I, JOHN M. ROLL, a citizen of the United States, residing at Correctionville, in the county of Woodbury and State of Iowa, have invented new and useful Improvements in Tire-Tread-Removing Devices, of which the following is a specification.

This invention relates to a device for removing treads from tires and has for its primary object the construction of a device of this character that will remove a tread from the tire in less time and with less effort than is now accomplished with other devices.

An object of the invention is to provide a device of few substantial parts that may be manufactured at a relatively low cost and which may be renewed at very little expense.

A feature of the invention is the novel manner of constructing each blade and associating same with the wheel so that a tire may be acted upon in the most efficient manner.

Figure 1 is a side elevation of the wheel of the device.

Fig. 2 is a vertical sectional view.

Fig. 3 is a detailed view of the blade.

Again referring to the drawing illustrating one construction of my invention the numeral 1 designates a wheel consisting of the hub 2, web portion 3 and rim 4. The rim, at spaced points, is provided with recesses 5 their walls 6 so disposed as to regulate the position of the cutting blades 7. It will be noted that each cutting blade 7 has one edge abutting one wall of the recess so as to prevent the screws 8 from being subject to excessive strain during the cutting operation. It will be noted that the beveled edge 9 of each blade is spaced a pre-determined distance from the rim so that the tread will be removed in a very efficient manner. In Fig. 4 I have shown a blade provided with a concave cutting edge 10 so as to increase the action between the blade and tread of the tire.

From the foregoing description taken in connection with the accompanying drawing it will be apparent that with my device a continuous operation can be performed in the removal of the tread of a tire thereby materially reducing the time necessary for such operation and accomplishing the same in a more satisfactory manner.

It is, of course, to be understood that the invention may be constructed in various other manners and the parts associated in different relations and, therefore, I do not desire to be limited in any manner except as set forth in the claim hereunto appended.

Having thus described my invention what I claim is:

A tire tread removing device comprising a wheel having a relatively broad rim provided at spaced points with recesses, and a blade detachably mounted in each recess, and having a beveled edge spaced a pre-determined distance from the rim, said edge being of an arcuate shape to conform to the periphery of a tire.

In testimony whereof I affix my signature.

JOHN M. ROLL.